COMPOSITIONS COMPRISING POLYPROPYLENE, ETHYLENE - PROPYLENE COPOLYMER, AND ALIPHATIC DICARBOXYLIC ACID DIESTER

Heinrich Peters, Wiesbaden, Dietrich Schleede, Frankfurt am Main, and Felix Schülde, Neuenhain, Taunus, Germany, assignors to Hercules Incorporated, a corporation of Delaware
No Drawing. Filed May 21, 1964, Ser. No. 369,276
Claims priority, application Germany, July 10, 1963, F 40,193
3 Claims. (Cl. 260—31.8)

Stereoregular polypropylene is a thermoplastic material which, because of its physical and processing properties, has found wide applications. However, the impact strength of the product, which is still unsatisfactory in certain cases, especially at reduced temperatures, has prevented its use in some fields of application.

Various proposals for improving the impact strength of polypropylene at room temperature and at low temperatures have already been disclosed, but up to now, any significant improvement of the impact strength has always been accompanied by a reduction of the hardness and rigidity and frequently by a deterioration of the thermoplastic processability. However, a deterioration of these properties cannot be tolerated, since polypropylene is particularly distinguished from other thermoplastics by its rigidity and favorable processability. Processability is measured by the melt index, $I_5/250°$, which expresses the quantity of polymer at 250° C. which can be forced through a specified orifice in one minute by a piston weighing 5 kilograms according to the method of ASTM 1238–62T. In this case, the known relationship between processability and molecular weight applies, according to which the processability deteriorates as molecular weight increases. Molecular weight is measured by the reduced specific viscosity (RSV) determined with a 0.1% solution in decahydronaphthalene at 135° C. With increasing molecular weight the toughness of the products also increases—at room temperature as well as at reduced temperatures. Therefore, it is of no advantage to increase the toughness of polypropylene by mixing it with other products, if the processability deteriorates at the same time, since a similar effect can be obtained by simply using products of higher molecular weight. On the other hand, mixtures of polypropylene, in which the toughness is increased with simultaneous improvement of the processability, would be highly desirable. In such a case it would then be possible to improve the toughness still further by using for the mixtures a polymer of higher molecular weight, whose toughness and processability would be improved still more by the use of the additive.

U.S. Patent 2,655,492 describes mixtures having improved elasticity in which polyethylene is blended with styrene copolymers, which copolymers can contain, inter alia, a propylene portion. In contrast to the propylene polymers described below, such products are based on polyethylene and therefore have essentially the properties of polyethylene. German Auslegeschrift No. 1,104,694 describes mixtures of polypropylene with copolymers of propylene and 30–70% ethylene. The addition of the copolymer increases the toughness of the polypropylene. However, to obtain a significant improvement of the impact strength, copolymers of relatively high molecular weight must be added. This causes a considerable deterioration of the processability. Belgian Patent 582,153 discloses improving the toughness of polypropylene by admixing therewith a copolymer of 3–20% propylene and 80–97% ethylene. The improvement of the toughness obtained by this method is still not sufficient for some applications, especially since the examples start with polypropylene having a relatively high molecular weight, which already has a rather high impact strength.

Improvement of the toughness of polypropylene by blending with periodic copolymers of propylene and ethylene, which contain more than 50% by weight of propylene, is described in German Auslegeschrift 1,145,792. However, such periodic copolymers are relatively difficult to prepare. Compared with them the molding compounds of the invention described herein have the advantage of being more easily produced. Mixtures of polypropylene with 5–20% polyisobutylene are known from German Auslegeschrift 1,124,239. Such mixtures are distinguished by their insensitivity to impact stresses, particularly in the cold. Their disadvantages are the poor processability (large decrease of melt index) and the complications involved in incorporating the rubbery polyisobutylene into the polypropylene, which incorporation must be carried out on a heated mixing roll.

Mixtures of polypropylene with styrene-butadiene rubber or natural rubber have also been described. Compared with pure polypropylene, these mixtures have an increased low temperature impact strength. However, in this case the incorporation must also be carried out on heated mixing rolls. Furthermore, the limited heat resistance of these rubbers causes difficulties in the processing of the mixture, e.g. by injection molding. Also the resistance to aging of polypropylene suffers from the addition of the double-bond-containing rubbers.

It is known from U.S. Patent No. 2,940,949 that polypropylene can be improved, particularly in its low temperature impact strength, by addition of an alkyl decyl adipate, whose alkyl group contains 6–12 C atoms, or a polyethylene glycol diester. The disadvantage of such additions is that they also reduce the rigidity and hardness of the polymer, i.e. they act as plasticizers.

It has now been found that molding compounds consisting of (1) isotactic polypropylene and (2) 2 to 28% by weight (based on the total mass) of at least one copolymer of ethylene and/or propylene and/or butene-(1), and (3) 28 to 2% by weight (based on the total mass) of at least one dialkyl ester of an aliphatic dicarboxylic acid are particularly suitable for the preparation of impact resistant molded articles.

The molding compounds according to the invention show at room temperature and also at temperatures below 0° C. a considerable improvement in both plain and notched bar impact strength. To our surprise, we found that by using a mixture of the two additive components the impact strength is improved more greatly than by using an equal amount of only one of the two mixing components. In addition, the flow as measured by melt index ($I_5/250°$ C.), and thus the thermoplastic processability of the polypropylene are increased more by addition of this mixture than by addition of the plasticizer alone.

This synergistic activity was found not only with the special adipates claimed in U.S. Patent 2,940,949, but quite generally with dialkyl esters of aliphatic dicarboxylic acids. Molding compositions containing diesters of dicarboxylic acids of the general formula:

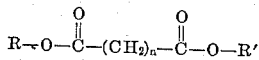

in which R and R' are alkyl radicals containing 3 to 20 carbon atoms, preferably 4 to 18 carbon atoms, and $n$ is 1 to 9, preferably 2 to 8, were found particularly favorable. Mixtures with di-2-ethylhexyl adipate are particularly good. Suitable dicarboxylic acid diesters also include distearyl glutarate, stearyldecyl adipate, dilauryl azelate, di-2-ethylhexyl sebacate, and hexyllauryl sebacate. Suitable mixtures contain copolymers with reduced specific viscosity (RSV) as determined in decahydrophthalene at 135° C. between 2 and 10, preferably between 3 and 6, consisting of 20 to 95% by weight of ethylene and 80 to 5% by weight of propylene and/or butene-(1), or copolymers of 10 to 90% by weight of propylene and 90 to 10% by weight of butene-(1). Amorphous copolymers containing 30 to 70% by weight of ethylene and 70 to 30% by weight of propylene and/or butene-(1), e.g. the copolymer of 50% by weight of ethylene and 50% by weight of propylene, are particularly suitable.

An isotatic polypropylene with RSV between 1.8 and , preferably between 2 and 12, is especially suitable the main constituent of the molding compounds. Owing the considerable improvement of the flow effected by e blending it is possible to use for the mixture a polyopylene or copolymer of higher molecular weight and obtain in this way particularly high-grade mixtures ith satisfactory flow.

For special fields of application it is possible to prepare products of extraordinary good flow properties by ixing polypropylene of very low molecular weight with copolymer of high molecular weight and a plasticizer. ich mixtures are distinguished by combining a very vorable processability with high toughness. Compared ith the processes for the improvement of the toughness polypropylene known up to now the molding compounds of the present process have the following advanges:

(1) The molding compounds can be prepared according to conventional processes in a simple manner. For example, it is possible to use a standard mixer, an eccentric tumble mixer, or an impeller for the mixing and distribution of the individual components. This is followed by a granulation on the extruder without having to interpolate a plasticizing on heated mixing rolls into the process.

(2) The processing of the granulated molding compounds, e.g. by injection molding, does not cause any difficulties, since the flow of the molding compounds is improved as compared with pure polypropylene or previously known impact resistant polypropylene mixtures.

On the other hand, it is also possible to prepare mixtures of polypropylene or copolymer of especially high molecular weight with the usual high melt index and to obtain products of extremely good impact resistance.

(3) The mechanical properties are in their totality more favorable than those of other mixtures of this kind. The components being added have practically no effect on aging properties of polypropylene, such as heat stability or light stability. The mixtures described can be stabilized, pigmented, and dyed, as well as mixed with fillers or fortifying agents or other conventional additives in the conventional way.

*Examples*

Three different isotactic polypropylene powders with RSV of 2.8, 3.8, and 6.0, respectively, were mixed with the components given in Tables I–III, granulated on an extruder, and injection molded into test plates and dishes. The above-mentioned mechanical properties were examined on the test plates. The dishes were subjected to a falling ball test, in which the height of fall of a 5 kg. ball at which the dishes broke was determined. The test results are summarized in tables.

TABLE I.—PROPERTIES OF COMPOSITIONS CONTAINING POLYPROPYLENE OF RSV 2.8

| Example | Dicarboxylic Acid Ester | Percent by Weight | Copolymer Composition [1] | | | Percent by Weight | Flexural Stress,[2] kg./cm.² | Ball Indentation Hardness,[3] kg./cm.² | Melt Index[4] of Blend $I_5/250°$, g./min. |
|---|---|---|---|---|---|---|---|---|---|
| | | | 50 | 50 | | 5.0 | 480 | 810/765 | 22.0 |
| | | | 50 | 50 | | 2.5 | 420 | 736/682 | 13.4 |
| | Di-2-ethyl-hexyl adipate | 2.5 | 50 | 50 | | 10 | 417 | 742/687 | 27.8 |
| | | | 50 | 50 | | 5.0 | 352 | 645/601 | 10.7 |
| | Di-2-ethyl-hexyl adipate | 5.0 | 50 | 50 | | 5.0 | 371 | 647/598 | 38.7 |
| | do | 10 | | | | | 325 | 582/545 | 25.3 |
| | Di-2-ethyl-hexyl sebacate | 5.0 | 50 | 50 | | 5.0 | 357 | 630/583 | 36.4 |
| | Di-2-ethyl-hexyl adipate | 5.0 | | | 50 | 5.0 | 362 | 637/590 | 37.0 |
| | Distearyl adipate | 5.0 | 55 | | 45 | 5.0 | 370 | 625/580 | 34.2 |
| | Dilauryl sebacate | 5.0 | 20 | 30 | 50 | 5.0 | 359 | 632/578 | 36.9 |
| | Dilauryl adipate | 10.0 | 40 | | 60 | 10.0 | 305 | 575/522 | 43.8 |
| | Distearyl sebacate | 5.0 | 10 | 10 | 80 | 10.0 | 297 | 583/538 | 40.7 |
| | Di-2-ethyl-hexyl adipate | 5.0 | 50 | 50 | | 2.5 | 369 | 640/582 | 39.1 |
| | | | | 50 | 50 | 2.5 | | | |
| | do | 10.0 | 10 | 90 | | 10.0 | 299 | 585/540 | 45.0 |
| | do | 10.0 | 90 | | 10 | 10.0 | 302 | 589/542 | 46.3 |
| | Didecyl adipate | 5.0 | 50 | 50 | | 5.0 | 375 | 642/590 | 42.4 |
| | Didecyl azelate | 5.0 | 50 | | 50 | 5.0 | 365 | 639/588 | 39.8 |

| Example | Dicarboxylic Acid Ester | Notched Impact Strength,[5] cm. kg./cm.² | | | Impact Strength,[5] cm. kg./cm.² | | | Height of fall of 5 kg. Ball in cm. on dishes 29 cm. in Diameter |
|---|---|---|---|---|---|---|---|---|
| | | +20° C. | 0° C. | −20° C. | +20° C. | 0° C. | −20° C. | |
| | | 2.4 | 1.5 | 1.3 | (*) | 25 | 11 | 40 |
| | | 5.2 | 1.9 | 1.7 | (*) | 47 | 24 | 90 |
| | Di-2-ethyl-hexyl adipate | 7.0 | 2.2 | 2.1 | (*) | 65 | 32 | 150 |
| | | 7.6 | 2.4 | 2.0 | (*) | (*) | 38 | 170 |
| | Di-2-ethyl-hexyl adipate | 10.4 | 4.1 | 2.7 | (*) | (*) | 65 | 250 |
| | do | 6.3 | 3.2 | 1.9 | (*) | (*) | 37 | 140 |
| | do | 9.9 | 4.3 | 2.8 | (*) | (*) | 72 | 240 |
| | do | 14.5 | 4.8 | 3.1 | (*) | (*) | 69 | 250 |
| | Distearyl adipate | 12.3 | 5.1 | 2.9 | (*) | (*) | 78 | 250 |
| | Dilauryl sebacate | 12.0 | 5.7 | 2.8 | (*) | (*) | 75 | >250 |
| | Dilauryl adipate | 18.7 | 6.2 | 3.8 | (*) | (*) | (*) | >250 |
| | Distearyl sebacate | 13.1 | 5.2 | 2.9 | (*) | (*) | 95 | >250 |
| | Di-2-ethyl-hexyl adipate | 15.2 | 5.8 | 2.9 | (*) | (*) | 88 | 240 |
| | do | 18.1 | 6.4 | 3.5 | (*) | (*) | (*) | >250 |
| | do | 19.3 | 6.8 | 3.7 | (*) | (*) | (*) | >250 |
| | Didecyl adipate | 14.7 | 4.9 | 3.1 | (*) | (*) | 97 | 250 |
| | Didecyl azelate | 12.9 | 5.3 | 2.8 | (*) | (*) | 95 | 240 |

[1] Ethylene/propylene/butene-1.
[2] According to ASTM D–790–61.
[3] According to German Industrial Standard (DIN) 57302.
[4] According to ASTM 1238–62T.
[5] According to ASTM D–256–56.
*Samples did not break.

TABLE II.—PROPERTIES OF COMPOSITIONS CONTAINING POLYPROPYLENE OF RSV 3.8

| Example | Dicarboxylic Acid Ester | Percent by Weight | Copolymer Composition [1] | | | Percent by Weight | Flexural Stress,[2] kg./cm.² | Ball Indentation Hardness,[3] kg./cm.² | Melt Index of Blend $I_5/250°$, g./min. |
|---|---|---|---|---|---|---|---|---|---|
| 18 | | | | | | | 465 | 704/646 | 6. |
| 19 | | | 50 | 50 | | 5.0 | 420 | 638/575 | 5. |
| 20 | Di-2-ethyl-hexyl adipate | 2.5 | 50 | 50 | | 2.5 | 425 | 645/580 | 8. |
| 21 | Di-2-ethyl-hexyl adipate | 5.0 | 50 | 50 | | 10 | 340 | 520/460 | 4. |
| 22 | do | 10 | 50 | 50 | | 5.0 | 350 | 527/463 | 11. |
| 23 | | | | | | | 302 | 482/426 | 8. |
| 24 | Di-2-ethyl-hexyl sebacate | 5.0 | 50 | 50 | | 5.0 | 335 | 524/472 | 9. |
| 25 | Di-2-ethyl-hexyl adipate | 5.0 | | 50 | 50 | 5.0 | 340 | 520/468 | 10. |
| 26 | Distearyl adipate | 5.0 | 55 | | 45 | 5.0 | 355 | 532/483 | 11. |
| 27 | Dilauryl sebacate | 5.0 | 20 | 30 | 50 | 5.0 | 345 | 522/471 | 12. |
| 28 | Dilauryl adipate | 10 | 40 | | 60 | 10 | 275 | 445/387 | 18. |
| 29 | Distearyl sebacate | 5 | 10 | 10 | 80 | 10 | 301 | 475/418 | 17. |
| 30 | Di-2-ethyl-hexyl adipate | 5 | 50 / — | 50 / 50 | — / 50 | 2.5 / 2.5 | 352 | 520/461 | 11. |
| 31 | do | 10 | 10 | 90 | | 10 | 327 | 412/375 | 22. |
| 32 | do | 10 | 90 | | 10 | 10 | 309 | 435/382 | 19. |
| 33 | do | 5 | 50 | 50 | | 5 | 372 | 542/484 | 15. |
| 34 | Di-2-ethyl-hexyl azelate | 5 | 50 | | 50 | 5 | 360 | 538/475 | 17. |

| Example | Dicarboxylic Acid Ester | Notched Impact Strength,[5] cm. kg./cm.² | | | Impact Strength,[5] cm. kg./cm.² | | | Height of fall of 5 kg. Ball in cm. on dishes 29 cm. in Diameter |
|---|---|---|---|---|---|---|---|---|
| | | +20° C. | 0° C. | −20° C. | +20° C. | 0° C. | −20° C. | |
| 18 | | 3.4 | 1.9 | 1.8 | (*) | 34 | 16 | 80 |
| 19 | | 6.3 | 1.9 | 1.4 | (*) | 55 | 30 | 150 |
| 20 | Di-2-ethyl-hexyl adipate | 8.8 | 2.8 | 2.0 | (*) | 81 | 37 | 180 |
| 21 | Di-2-ethyl-hexyl adipate | 8.1 | 2.3 | 2.1 | (*) | (*) | 47 | 250 |
| 22 | do | 12.9 | 4.8 | 2.9 | (*) | (*) | 76 | 240 |
| 23 | | 6.5 | 3.9 | 2.0 | (*) | (*) | 51 | 160 |
| 24 | Di-2-ethyl-hexyl sebacate | 13.4 | 4.9 | 2.8 | (*) | (*) | 81 | 240 |
| 25 | Di-2-ethyl-hexyl adipate | 18.2 | 5.8 | 3.5 | (*) | (*) | 83 | 250 |
| 26 | Distearyl adipate | 15.1 | 6.2 | 4.3 | (*) | (*) | 78 | 230 |
| 27 | Dilauryl sebacate | 13.2 | 5.8 | 3.7 | (*) | (*) | 88 | 230 |
| 28 | Dilauryl adipate | 37 | 9.3 | 7.1 | (*) | (*) | (*) | >250 |
| 29 | Distearyl sebacate | 23 | 8.7 | 6.2 | (*) | (*) | (*) | >250 |
| 30 | Di-2-ethyl-hexyl adipate | 15.4 | 6.7 | 3.8 | (*) | (*) | 79 | >220 |
| 31 | do | 25.0 | 7.9 | 5.4 | (*) | (*) | (*) | >250 |
| 32 | do | 22.0 | 8.5 | 6.0 | (*) | (*) | (*) | >250 |
| 33 | do | 13.8 | 5.2 | 3.2 | (*) | (*) | 82 | 250 |
| 34 | Di-2-ethyl-hexyl azelate | 12.7 | 5.3 | 3.2 | (*) | (*) | 91 | 250 |

See footnotes at end of Table I.

TABLE III.—PROPERTIES OF COMPOSITIONS CONTAINING POLYPROPYLENE OF RSV 6.0

| Example | Dicarboxylic Acid Ester | Percent by Weight | Copolymer Composition [1] | | | Percent by Weight | Flexural Stress,[2] kg./cm.² | Ball Indentation Hardness,[3] kg./cm.² | Melt Index [4] of Blend $I_5/250°$, g./min. |
|---|---|---|---|---|---|---|---|---|---|
| 35 | | | | | | | 430 | 650/580 | 0.4 |
| 36 | | | 50 | 50 | | 5.0 | 372 | 575/522 | 0.3 |
| 37 | Di-2-ethyl-hexyl adipate | 2.5 | 50 | 50 | | 2.5 | 383 | 583/540 | 0.5 |
| 38 | | | 50 | 50 | | 10 | 305 | 497/452 | 0.5 |
| 39 | Di-2-ethyl-hexyl adipate | 5.0 | 50 | | 50 | 5.0 | 325 | 509/457 | 0.7 |

| Example | Dicarboxylic Acid Ester | Notched Impact Strength,[5] cm. kg./cm.² | | | Impact Strength,[5] cm. kg./cm.² | | | Height of fall of 5 kg. Ball in cm. on dishes 29 cm. in Diameter |
|---|---|---|---|---|---|---|---|---|
| | | +20° C. | 0° C. | −20° C. | +20° C. | 0° C. | −20° C. | |
| 35 | | 7.5 | 2.6 | 2.0 | (*) | (*) | 38 | 150 |
| 36 | | 12.4 | 3.5 | 2.2 | (*) | (*) | (*) | 200 |
| 37 | Di-2-ethyl-hexyl adipate | 17.2 | 4.3 | 2.4 | (*) | (*) | (*) | 220 |
| 38 | | 16.6 | 3.2 | 2.1 | (*) | (*) | (*) | 210 |
| 39 | Di-2-ethyl-hexyl adipate | 19.3 | 6.2 | 4.2 | (*) | (*) | (*) | >250 |

See footnotes at end of Table I.

What we claim and desire to protect by Letters Patent is:

1. A propylene polymer composition comprising:
   (1) stereoregular polypropylene,
   (2) about 2 to 10% based on the total weight of the mass of a copolymer selected from the class consisting of;
     (a) copolymers of ethylene and propylene containing about 10 to 50% ethylene,
     (b) copolymers of ethylene and butene-1 containing about 40 to 90% ethylene, and
     (c) a copolymer of propylene and butene-1 containing about 50% propylene, and
   (3) about 2 to 10%, based on the total weight of the mass of an aliphatic dicarboxylic acid diester having the structural formula

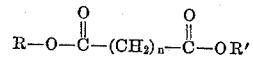

where R and R' are individual aliphatic radicals having 8 to 18 carbon atoms and $n$ is an integer from 4 to 8.

2. A composition according to claim 1 where the dicarboxylic acid diester is selected from the class consisting of di-2-ethylhexyl adipate, di-2-ethylhexyl sebacate, 2-ethylhexyl azelate, didecyl azelate, and didecyl pate.

5. A propylene polymer composition comprising:
(1) stereoregular polypropylene,
(2) about 2 to 10%, based on the total weight of the mass, of a copolymer containing about 50% by weight of ethylene and about 50% by weight of propylene, and
(3) about 2 to 10%, based on the total weight of the mass, of di-2-ethylhexyl adipate.

References Cited

UNITED STATES PATENTS

| 2,940,949 | 6/1960 | Mullin | 260—31.8 |
| 3,018,263 | 1/1962 | Schneider | 260—897 |
| 3,036,987 | 5/1962 | Ranalli | 260—897 |
| 3,189,574 | 6/1965 | Rogers et al. | 260—897 |

MORRIS LIEBMAN, *Primary Examiner.*

L. T. JACOBS, *Assistant Examiner.*